US006912508B1

(12) United States Patent
McCalden et al.

(10) Patent No.: US 6,912,508 B1
(45) Date of Patent: Jun. 28, 2005

(54) METHOD AND APPARATUS FOR PROMOTING TAXPAYER COMPLIANCE

(75) Inventors: John D. McCalden, Reston, VA (US); John W. Bace, Somerville, MA (US); Robert Longo, Arlington, VA (US)

(73) Assignee: American Management Systems, Inc., Fairfax, VA (US)

( * ) Notice: Subject to any disclaimer, the term of this patent is extended or adjusted under 35 U.S.C. 154(b) by 619 days.

(21) Appl. No.: 09/375,214

(22) Filed: Aug. 16, 1999

(51) Int. Cl.[7] ............................................. G06F 17/60
(52) U.S. Cl. ............................. 705/31; 705/7; 705/10; 705/16; 705/19; 705/17; 705/24; 705/26; 705/30; 380/24
(58) Field of Search ....................... 705/31, 16; 707/100

(56) References Cited

U.S. PATENT DOCUMENTS

| | | | | |
|---|---|---|---|---|
| 5,787,274 A | * | 7/1998 | Agrawal et al. | ........ 707/100 X |
| 5,790,645 A | * | 8/1998 | Fawcett et al. | ............. 379/189 |
| 6,016,479 A | | 1/2000 | Taricani, Jr. | .................. 705/19 |
| 6,321,206 B1 | * | 11/2001 | Honarvar | ....................... 705/7 |

FOREIGN PATENT DOCUMENTS

WO    WO 9843182    * 10/1998

OTHER PUBLICATIONS

No Author, "State of Texas Selects NCR Data Warehouse Solution to Help it Collect $43 Million in Additional Taxes" PR Newswire, May 18, 1998.*

Betts, "Tax Collectors Going to New Wave System" Computerworld, v. 29 n. 47 p 71–72, Nov. 20, 1995.*

No Author, "Internal Revenue Service Uses Viador for Web-Based Access to Compliance Data Warehouse" PR Newswire, Apr. 12, 1999.*

No Author, "IRS Musters IT to Snare Cheats" Newsbytes, May 5, 1998.*

Talila, Baron, "Business Intelligence Pays Dividends—Companies and Governments Use Software to Reduce Losses Due to Fraud," Information Week; Mar. 27, 2000, p. 150.

Olsen, Florence, "IRS musters IT to snare cheats," Government Computer News; Apr. 27, 1998 v17 n11 p1(2).

White, Rick, "IRS Uses IT To Improve Services—Errors Caught, Money Saved For Tax Agency," Information Week, Apr. 12, 1999; p119(1).

De Bruce, Orlando, "IRS Data Project Boosts Debt Collection," Federal Computer Week, Apr. 19, 1999; v13 i11 p21(1).

Tiboni, Frank, Menke, Susan M., Daukantas, Patricia, "IRS wins warehouse award," Government Computer News, Aug. 23, 1999; v18 i27 p6.

"Tax System Modernization," Government Computer News, Oct. 19, 1998; p14(1).

American Management Systems (AMS) document titled "State of California," pp. 1–16, describing AMS system existing prior to the filing date of the present application.

* cited by examiner

*Primary Examiner*—Jean Dorio Janvier
(74) *Attorney, Agent, or Firm*—Staas & Halsey LLP

(57) ABSTRACT

A method and apparatus for promoting taxpayer compliance. A computer-implemented data mining system mines taxpayer data to identify taxpayer profiles for taxpayer compliance issues. A computer-implemented decision management system assigns the identified taxpayer profiles into groups based on characteristics of the taxpayer profiles. A computer-implemented case management system implements different treatments to different groups, to improve taxpayer compliance.

14 Claims, 10 Drawing Sheets

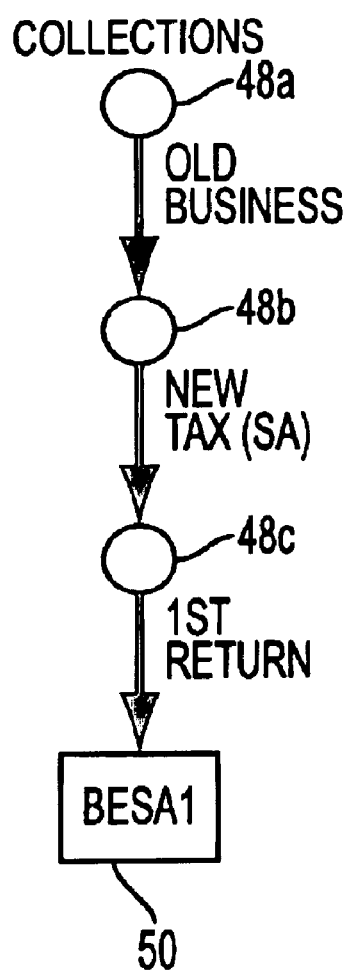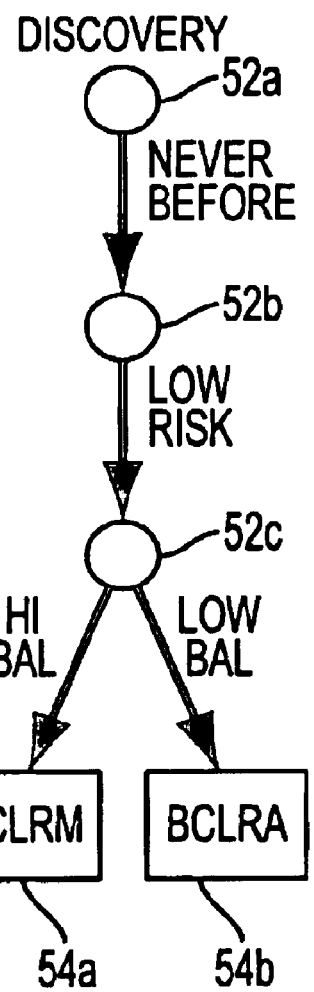
FIG. 3B
FIG. 3C

METHOD AND APPARATUS FOR PROMOTING TAXPAYER COMPLIANCE

BACKGROUND OF THE INVENTION

1. Field of the Invention

The present invention relates to a method and apparatus for promoting taxpayer compliance. More specifically, the present invention relates to a method and apparatus which integrate computerized techniques for data mining, decision management and case management into a complete system which promotes taxpayer compliance.

2. Description of the Related Art

Governmental tax agencies perform many functions relating to taxpayer compliance. Typically, these functions include, for example, (a) educating taxpayers as to their tax liabilities and how to comply with these liabilities, (b) collecting tax liabilities, including overdue tax liabilities and (c) selectively auditing taxpayers.

To perform these functions, tax agencies typically review taxpayer data and implement specific solutions based on a review of the data. However, the review of data and implementation of a specific solution is typically performed in a manual, ad hoc manner, and independent of that for other solutions. Moreover, the implementation of a solution is typically more a reactive response by the tax agency to a problem, as opposed to a proactive response.

SUMMARY OF THE INVENTION

Accordingly, it is an object of the present invention to provide a method and apparatus for promoting taxpayer compliance in an efficient, fair, proactive and effective manner.

Additional objects and advantages of the invention will be set forth in part in the description which follows, and, in part, will be obvious from the description, or may be learned by practice of the invention.

Objects of the present invention are achieved by providing a method and apparatus which integrate computerized techniques for data mining, decision management and case management, to promote taxpayer compliance.

More specifically, objects of the present invention are achieved by providing a method which includes (a) mining taxpayer data by a computer to identify taxpayer profiles for taxpayer compliance issues; (b) assigning the identified taxpayer profiles by a computer into groups based on characteristics of the taxpayer profiles; and (c) implementing different treatments to different groups, to improve taxpayer compliance. Various software utilities can be provided for mining the taxpayer data. These software utilities include, for example, (i) an audit selection utility which identifies taxpayer profiles for tax auditing, (ii) a collection utility which identifies taxpayer profiles for collection purposes, (iii) a discovery utility which identifies taxpayer profiles for discovery purposes, and (iv) an education utility which identifies taxpayer profiles which indicate a need for further tax education of the taxpayer.

Moreover, objects of the present invention are achieved by providing an apparatus which includes a computer-implemented data mining system, a computer-implemented decision management system and a computer-implemented case management system. The data mining system mines taxpayer data to identify taxpayer profiles for taxpayer compliance issues. The decision management system assigns the identified taxpayer profiles into groups based on characteristics of the taxpayer profiles. The case management system implements different treatments to different groups, to improve taxpayer compliance.

BRIEF DESCRIPTION OF THE DRAWINGS

These and other objects and advantages of the invention will become apparent and more readily appreciated from the following description of the preferred embodiments, taken in conjunction with the accompanying drawings of which:

FIGS. 3(A), 3(B) and 3(C) are diagrams illustrating the assignment of taxpayers into groups by a decision management component of a taxpayer compliance system, according to an embodiment of the present invention.

DESCRIPTION OF THE PREFERRED EMBODIMENTS

Figure 1:
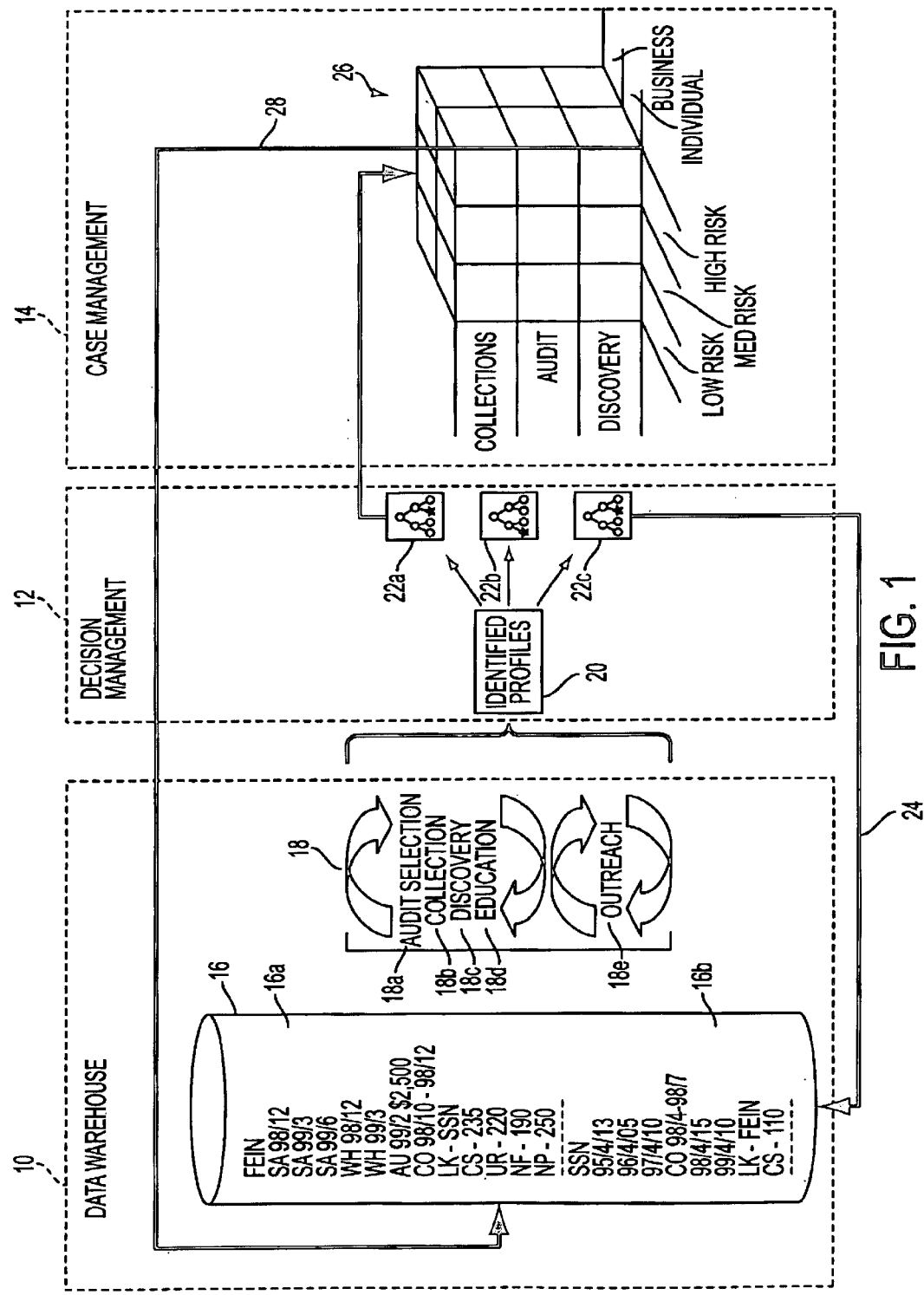
FIG. 1 is a diagram illustrating a taxpayer compliance system, according to an embodiment of the present invention.

Reference will now be made in detail to the present preferred embodiments of the present invention, examples of which are illustrated in the accompanying drawings, wherein like reference numerals refer to like elements throughout.

FIG. 1 is a diagram illustrating a taxpayer compliance system, according to an embodiment of the present invention. Referring now to FIG. 1, the system includes a data warehouse component 10, a decision management component 12 and a case management component 14.

Data warehouse component 10 identifies non-compliance or potential non-compliance by taxpayers. For example, data warehouse component 10 creates taxpayer profiles 16 through well-known, computer-implemented data warehouse and data mining techniques. Data warehouse component 10 might be based, for example, on ORACLE or SYBASE data warehouse and data mining software.

In FIG. 1, taxpayer profiles 16 are shown as including example data which might be included in taxpayer profiles. For example, as illustrated in FIG. 1, a first taxpayer profile 16a includes a federal employee identification number (FEIN) and data for that taxpayer. For example, as illustrated in FIG. 1 for taxpayer profile 16a, the data might include information relating to sales tax returns (SA) dated December 1998 (98/12), March 1999 (99/3) and June 1999 (99/6), withholding returns (WH) dated December 1998 (98/12) and March 1999 (99/3), an audit (AU) performed February 1999 (99/2) resulting in a tax liability of $2,500, the account being in collections (CO) from October 1998 (98/10) through December 1998 (98/12), a linkage (LK) from this taxpayer to another taxpayer with a specific social security number (SSN), a collection score (CS) of 235 for this taxpayer by a collection score model, an underreporting score (UR) of 220 for this taxpayer by an underreporting score model, a nonfiling score (NF) of 190 for this taxpayer by a nonfiling score model, and a nonpaying score (NP) of 250 by a nonpaying score model. The use of score models to predict specific behavior is well-known.

As illustrated in FIG. 1, a second taxpayer profile 16b includes data similar to that for first taxpayer profile 16a.

Of course, although only two individual taxpayer profiles 16a and 16b are shown in taxpayer profiles 16, many more taxpayer profiles would actually exist and be used, typically one for each known taxpayer and one for each known tax entity.

Data warehouse component 10 includes software utilities 18 to identify taxpayer profiles for which actions should be taken to promote taxpayer compliance and/or to achieve other objectives of the system.

For example, software utilities 18 include an audit selection utility 18a, a collection utility 18b, a discovery utility 18c and an education utility 18d. Audit selection utility 18a identifies taxpayer profiles for tax auditing by the agency. Collection utility 18b identifies taxpayer profiles for collection purposes (for example, requiring collection of late tax payments). Discovery utility 18c identifies taxpayer profiles for discovery purposes (for example, requiring inquiries to be made of the taxpayer by the agency). Education utility 18d identifies taxpayer profiles which indicate a need for further education of the taxpayer by the agency. For example, education utility 18d might identify taxpayer profiles for which the agency should send out literature on how to complete a specific tax schedule.

Further, an outreach utility 18e might also be included, to, for example, identify taxpayer profiles for which a communication should be made by the agency to inform taxpayers of a change in their tax liability. Such a change in liability could be based, for example, on a change in the tax code, or a policy change of the agency.

Therefore, software utilities 18 would browse taxpayer profiles 16 to identify taxpayers with certain characteristics, depending on the objective of the utility. For example, depending on the objective of the utility, a utility might browse taxpayer profiles 16 to identify taxpayers who (a) should have filed a tax return but have not; (b) are at risk of underreporting or who belong to a group that has been identified as one that consistently underreports or miscalculates a certain tax return or tax return line item; (c) present a statistical risk of becoming non-compliant in the future; or (d) have not paid their tax due by the tax due date.

The software utilities discussed above are only examples of the possible utilities. Many other utilities can be provided to identify taxpayer profiles for different purposes. Thus, the present invention is not intended to be limited to the specific utilities discussed herein.

Therefore, as indicated in FIG. 1, software utilities 18 produce identified profiles 20. Identified profiles 20 would include, for example, taxpayers that are potentially non-compliant and actually non-compliant with tax liabilities.

Decision management component 12 assigns identified profiles 20 into various groups, such as groups 22a, 22b and 22c, for different treatment. The assignment is based on characteristics of identified profiles 20. More specifically, for example, taxpayers that are potentially non-compliant would preferably be assigned to a group for which a treatment will be applied to effectively prevent future non-compliance by the taxpayer. Similarly, for example, taxpayers that are actually non-compliant would preferably be assigned to a group for which a treatment will be applied to effectively cure the non-compliance. Decision management component 12 uses known computer-based decision management techniques to assign taxpayer profiles. Such software-based decision management techniques might, for example, take the form of a decision tree and use information available in the system to achieve traversal of the decision tree to arrive at an end-node of the tree, and therefor at an assignment decision.

For example, decision management component 12 could use, for example, the American Management Systems (AMS) STRATA release 2.0 (hereinafter STRATA release 2.0), which is a decision management system. Decision management systems (also referred to as "decision support systems") are described, for example, in U.S. patent application titled "DECISION MANAGEMENT SYSTEM FOR CREATING STRATEGIES TO CONTROL MOVEMENT OF CLIENTS ACROSS CATEGORIES, U.S. Ser. No. 09/217,017, filed Dec. 21, 1998, which is incorporated herein by reference.

One extension of the assignment process performed by decision management component 12 is, for example, to ensure that not only are taxpayers assigned to the most effective treatments, but also that tax agency resources are used to the greatest effect. This may include ensuring that the cases worked by tax agency employees are those that will result in the largest revenue return per hour worked by those employees. It may also include ensuring that other cases not worked by tax agency employees are either held over to be worked by an employee on a subsequent day or are sent to an appropriate automated treatment.

An additional extension of the assignment process could be, for example, that the application of all treatments, both preventive and curative, are coordinated and applied to all taxpayers within a particular target group or segment of taxpayers. The objective in this case would be to impact the level of taxpayer compliance in the group as a whole, as well as of each taxpayer within the group.

The resulting assignments of decision management component 12 are fed back to data warehouse component 10 to be included in taxpayer profiles 16, as indicated by feedback loop 24.

After identified profiles 20 are assigned to groups 22a, 22b and 22c, case management component 14 applies different treatments to the different groups, to improve effectiveness of the overall taxpayer compliance system. For example, decision management component 12 might assign individual profiles 20 into various groups so that the taxpayers can be analyzed, for example, with a three dimensional model 26 as illustrated in FIG. 1. For example, as illustrated in FIG. 1, a first axis of model 26 includes different compliance objectives such as collections, audit and discovery, a second axis includes risk levels such as low risk, medium risk and high risk, and a third axis separates taxpayers based on whether the taxpayer is an individual or a business. For example, different treatments are then applied to the taxpayers by case management component 10 based on where the taxpayers are placed in model 26.

Treatment performance is measured and the performance results are fed back to data warehouse component 10 to be included in taxpayer profiles 16, as indicated by feedback loop 28. Measurement of treatment performance is an important piece of the overall system. Measurement of treatment performance will tell the tax agency how well the treatments are working and will also be used to determine whether alternative treatment assignment processes or alternative treatments are more effective than the current assignment process or treatment. This ability to measure performance is important for tracking the long term performance of key system components, such as behavior models.

Various types of case management software which can be used in case management component 14 are known. For example, case management component 10 could be based, for example, on the AMS CACS PLUS FOR GOVERNMENT, version 2.0, which is a known case management system.

As can be seen from FIG. 1, the taxpayer compliance system in FIG. 1 integrates together a data warehouse component, a decision management component and a case management component. These various components leverage each other to achieve a goal which would typically be, for example, to apply the right action to the right taxpayer at the right time.

Figure 2:
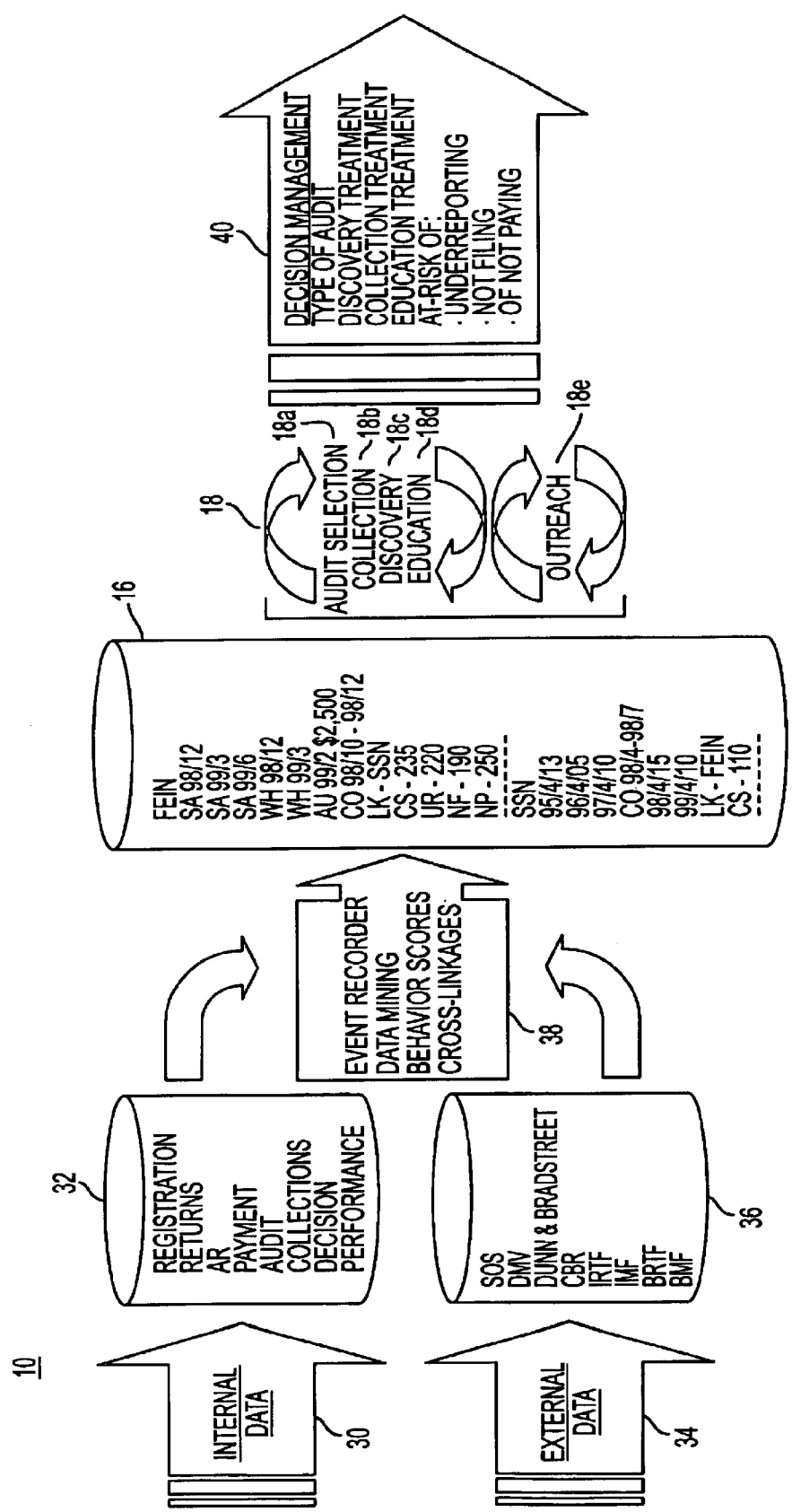
FIG. 2 is a diagram illustrating a data warehouse component of a taxpayer compliance system, according to an embodiment of the present invention.

FIG. 2 is a diagram illustrating data warehouse component 10, according to an embodiment of the present invention. Referring now to FIG. 2, a data extract (that is, a data feed) 30 provides internal data of the agency to a data store 32. The internal data could include, for example, registration information, return information, accounts receivable (AR) information, payment information, audit information, collections information, decision information (indicating, for example, decisions made by the agency and fed back by, for example, feedback loops 24 and 28 in FIG. 1) and performance information (indicating, for example, performance results fed back by, for example, feedback loop 28 in FIG. 1). These types of internal data are only intended as examples, and the present invention is not limited to any particular type of internal data. Moreover, in this example, "internal" is defined as being within the tax agency. However, the present invention is not limited to data confined to any particular agency or organization.

A data extract 34 provides external data to a data store 36. The external data could include, for example, data from the Secretary of State (SOS), data from the Department of Motor Vehicles (DMV), data from DUNN & BRADSTREET, data from a credit bureau (CBR), data from IRTF, IMF, BRTF and BMR, which are well-known data sharing programs between the United States Internal Revenue Service (IRS) and the various State governments. These types of external data are only intended as examples, and the present invention is not limited to any particular type of external data.

Data in data stores 32 and 36 are provided to a profile builder 38 which builds taxpayer profiles 16 from the data. Profile builder uses, for example, an event recorder, data mining, behavior scores and cross-linkages to build and update taxpayer profiles 16. For example, an event recorder updates taxpayer profiles when a relevant event occurs (for example, a tax return is filed, the account is sent to collections or a behavior score is calculated). Data mining is used to filter relevant information for the large amount of data in data stores 32 and 36. Behavior scores are computed using score models used to evaluate taxpayers. Cross-linkages indicate relevant links between taxpayers. The use of event recorders, data mining, behavior scores and cross-linkages is known.

While profile builder 38 is shown as using an event recorder, data mining, behavior scores and cross-linkages, profile builder 38 is not limited to including these operations. Instead, some of these operations may be eliminated, and others may be included.

Software utilities 18 analyze taxpayer profiles 16 to produce identified profiles 20 (see FIG. 1). Along with identified profiles 20, data warehouse component 10 routes information to decision management component 12, as indicated by arrow 40 in FIG. 2. This information includes, for example, (a) that an audit is to be performed for identified profiles, as determined by audit selection utility 18*a*; (b) that discovery treatment is to be performed for identified profiles, as determined by discovery utility 18*c*; (c) that collection treatment is to be performed for identified profiles, as determined by collection utility 18*b*; and that education treatment is to be performed for identified profiles, as determined by education utility 18*d*. The information routed to decision management component 12 could indicate, for example, which taxpayers were at-risk of underreporting, at-risk of not filing, and at-risk of not paying.

Figure 3A:
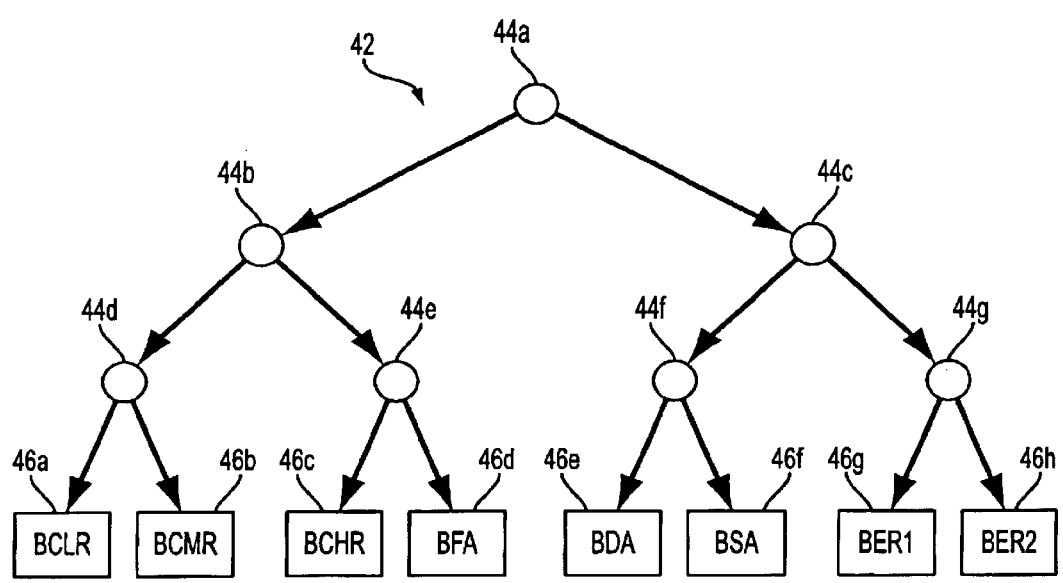

FIGS. 3(A), 3(B) and 3(C) are diagrams illustrating the assignment of taxpayers by decision management component 12 into different groups for different treatment, according to an embodiment of the present invention.

More specifically, FIG. 3(A) illustrates a decision tree 42 for assigning taxpayers to different groups, based on the information indicated by arrow 40 (see FIG. 2) passed from data warehouse component 10 to decision management component 12. Decision tree 42 would typically be only a portion of a much larger decision tree for assigning all the different types of taxpayers in the system into many different groups.

Decision tree 42 has a plurality of nodes 44*a* through 44*g*. Identified profiles 20 are analyzed with this tree structure to assign taxpayers into different groups 46*a* through 46*h*. For example, assume that a taxpayer owes a specific amount of money for a tax liability which has not been paid. Then, for example, a probability that the taxpayer will pay, based on a specific probability formula using data for that taxpayer, can be determined. At node 44*a*, this probability might be analyzed and, based on the value of the probability, the taxpayer would move to either node 44*b* or 44*c*. Then, a potential value (PVAL) of the taxpayer might be determined, where the potential value (PVAL) might equal the probability multiplied by the amount of the tax liability. For example, if the probability that a specific taxpayer will pay is 0.8 and the amount of the tax liability for that taxpayer is $1,000, then the potential value (PVAL) would be $800. At node 44*b*, the potential value (PVAL) might be analyzed and, based on the potential value, the taxpayer would move to either node 44*d* or 44*e*. Similarly, at node 44*c*, the potential value (PVAL) might be analyzed and, based on the potential value, the taxpayer would move to either node 44*f* or 44*g*. In this manner, taxpayers can be assigned to various groups 46*a* through 46*b*. There are many possible variations of such a decision tree for assigning taxpayers into groups.

FIG. 3(A) lists an individual decision code which might be used for each of groups 46*a* through 46*b*. For example, group 46*a* uses the decision code "BCLR" to indicate business collections low risk, group 46*b* uses the decision code "BCMR" to indicate business collections medium risk, group 46*c* uses the decision code "BCHR" to indicate business collections high risk, group 46*d* uses the decision code "BFA" to indicate business field audit, group 46*e* uses the decision code "BDA" to indicate business desk audit, group 46f uses the decision code "BSA" to indicate business self audit, group 46g uses the decision code "BER1" to indicate business education 1, and group 46h uses the decision code "BER2" to indicate business education 2. These decision codes are simply examples to indicate possible decision codes which might be used by a tax organization. However, the present invention is not intended to be limited to these codes, and it is highly likely that other codes would be used in actuality.

FIG. 3(B) is a diagram illustrating an example of a possible path through a decision tree to assign taxpayers to a group for collection purposes. Referring now to FIG. 3(B), from node 48a, the taxpayer might move to node 48b based on information indicating the taxpayer is an existing ("old") business that has paid taxes before. From node 48b, the taxpayer might move to node 48c if the tax to be collected is a new tax. From node 48c, the taxpayer may be assigned to group 50 if this is the first return filed by the taxpayer for the new tax. Here, group 50 might relate to business education sales tax 1 (BESA1). FIG. 3(B) does not illustrate all the nodes in the decision tree, but only the path followed by a respective taxpayer assigned to group 50.

FIG. 3(C) is a diagram illustrating an additional example of a possible path through a decision tree to assign taxpayers to a group for discovery. Referring now to FIG. 3(C), from node 52a, the taxpayer might move to node 52b based on information indicating the taxpayer has never before been subject to tax discovery by this revenue organization. From node 52b, the taxpayer might move to node 52c if data for this taxpayer indicates that the taxpayer is at low risk for noncompliance. From node 52c, the taxpayer might be assigned to group 54a if the taxpayer has a high outstanding tax balance, or group 54b if the taxpayer has a low outstanding tax balance. Here, in FIG. 3(C), group 54a indicates that the group relates to business collections low risk manual (BCLR), indicating that a manual procedure (such as a telephone call to the taxpayer) should be initiated, and group 54b indicates that the group relates to business collections low risk automatic (BCLRA), indicating that an automatic procedure (such as a computer generated letter to the taxpayer) should be initiated. FIG. 3(C) does not illustrate all the nodes in the decision tree, but only the path followed by a respective taxpayer assigned to group 55a or 54b.

The use of decision trees in a decision management system is well-known. Moreover, the present invention is not intended to be limited to use with decision trees for assigning clients into groups. Instead, various other assignment mechanisms can be used. However, decision trees would be the most typical.

Moreover, the various examples in FIGS. 3(A), 3(B) and 3(C) are only intended as examples to illustrate the operation of the present invention. There are many possible variations for assigning taxpayers into groups, and the present invention is not intended to be limited to any particular example or variation.

Figure 4:
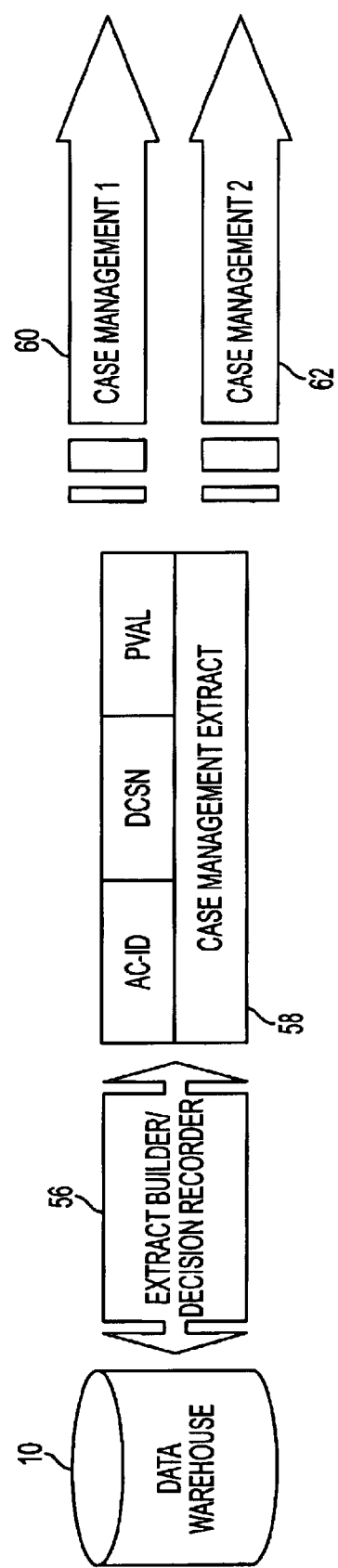
FIG. 4 is a diagram illustrating the flow of data from a data warehouse component to a case management component of a taxpayer compliance system, according to an embodiment of the present invention.

FIG. 4 is a diagram illustrating the flow of data from data warehouse component 10 to case management component 12. Referring now to FIG. 4, an extract builder/decision recorder 56 provides case information to a case management extract 58 for a specific taxpayer case, and also records decision information from decision management component 12 (see FIG. 1) and case management component 14 (see FIG. 1) in data warehouse component 10. Therefore, for example, the decision recorder operation of extract builder/decision recorder 56 corresponds to feedback loops 24 and 28 in FIG. 1. The extract builder operation corresponds, for example, to the operation of software utilities 18 (see FIG. 1) and the transfer of the data produced by software utilities 18 to decision management component 12.

The information provided to case management extract 58 by extract builder/decision recorder 56 includes, for example, an account ID (AC-ID) for a specific case, a decision code (DCSN) indicating the group to which the taxpayer for that case was assigned by the decision tree in FIG. 3(A), and the potential value (PVAL) for that taxpayer.

The information on case management extract 58 is then routed to case management component 14 (see FIG. 1), as indicated by arrow 60 in FIG. 4. Here, FIG. 4 includes arrows 60 and 62, indicating there might be several different case management systems in operation by the tax agency. Thus, arrow 60 indicates "case management 1" to thereby refer to case management component 14 in FIG. 1. Arrow 62 indicates "case management 2" to thereby refer to a different case management component which is not illustrated in the drawings.

Figure 5A:
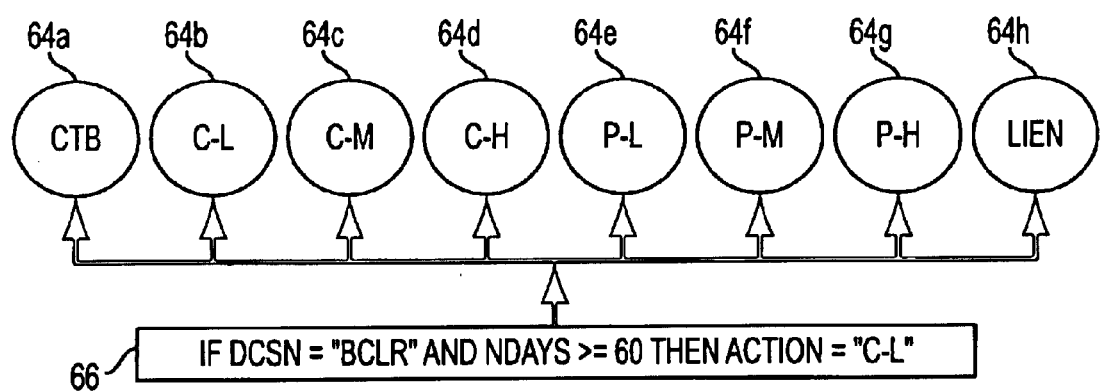
FIGS. 5(A) and 5(B) are diagram illustrating the operation of a case management component of a taxpayer compliance system, according to an embodiment of the present invention.
Figure 5B:
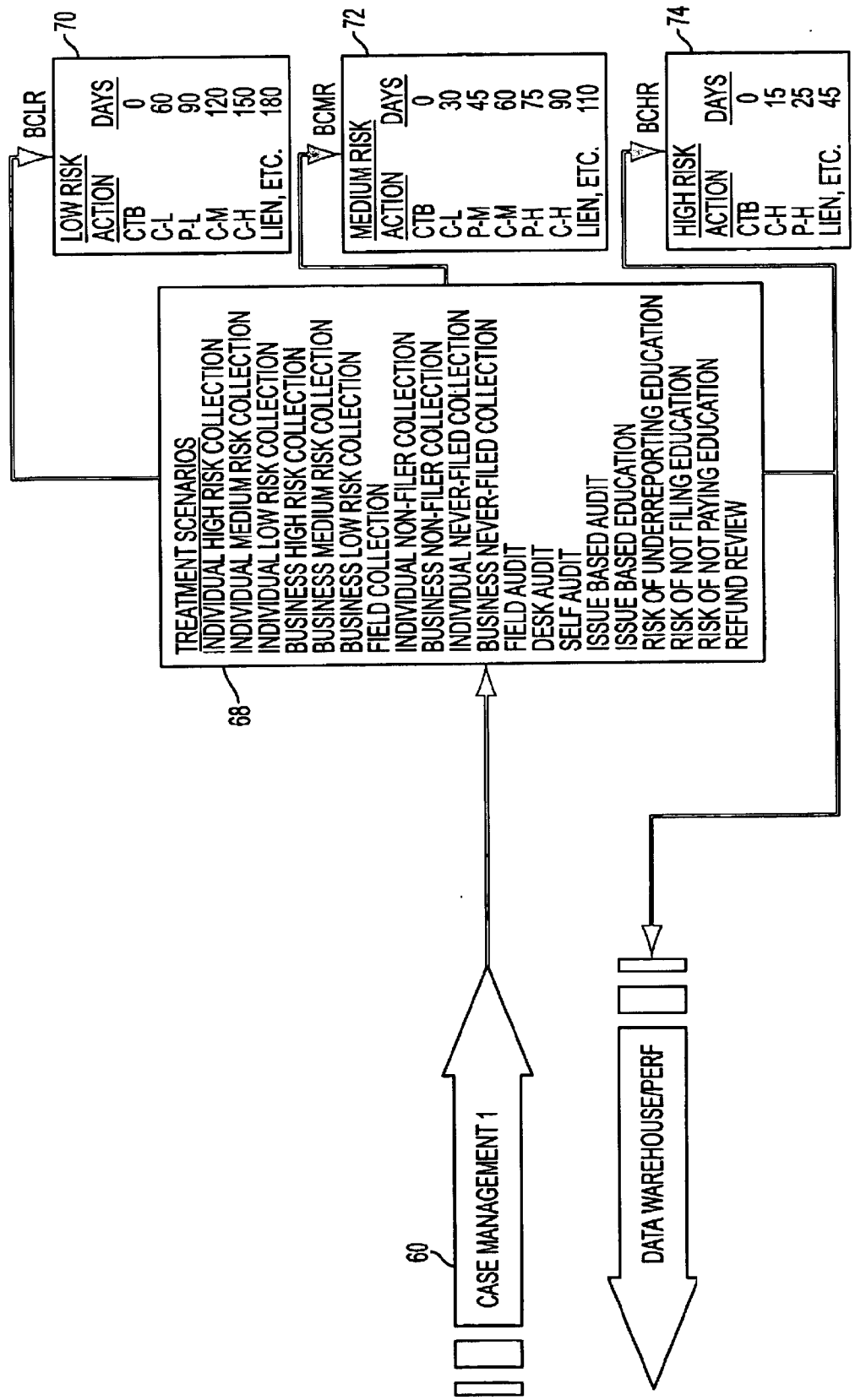

FIGS. 5(A) and 5(B) are diagram illustrating the operation of case management component 14, according to an embodiment of the present invention.

More specifically, FIG. 5(A) is a diagram illustrating an example of the overall concept of case management component 14, according to an embodiment of the present invention. Referring now to FIG. 5(A), in this example, actions 64a through 64h can be taken for taxpayers, based on the specific information for the taxpayer transferred to case management component 14 from decision management component 12. For example, action 64a (CTB) indicates that a consolidated tax bill (CTB) should be sent to the taxpayer. Action 64b (C-L) indicates that a correspondence (C) should be sent to the taxpayer, and that the correspondence should have a low (L) intrusive tone (that is, a non-threatening tone). Action 64c (C-M) indicates that a correspondence (C) should be sent to the taxpayer, and that the correspondence should have a medium (M) intrusive tone. Action 64d (C-H) indicates that a correspondence (C) should be sent to the taxpayer, and that the correspondence should have a high (H) intrusive tone. Action 64e (P-L) indicates that a phone call (P) should be made to the taxpayer, and that the phone call should have a low (L) intrusive tone (that is, a non-threatening tone). Action 64f(P-M) indicates that a phone call (P) should be made to the taxpayer, and that the phone call should have a medium (M) intrusive tone. Action 64g (P-H) indicates that a phone call (P) should be made to the taxpayer, and that the phone call should have a high (H) intrusive tone. Action 64h (LIEN) indicates that a lien should be made on property of the taxpayer. Case management component 14 might also separate these actions in accordance with whether the actions are to be performed manually (that is, by a human case worker) or automatically (that is, by a computer). For example, a phone call would be considered a manual action, as a case worker would call the taxpayer. By contrast, some types of correspondence might be automatic correspondence which is computer generated and automatically sent to the taxpayer. Further, case management component 14 might also separate actions in accordance with whether the actions are to be performed from a central office, or in the field.

Generally, case management component 14 takes one or more of actions 64a through 64h for a respective taxpayer. For example, as indicated in box 66 in FIG. 5(A), if the decision code (DCSN) provided on case management extract 58 (see FIG. 4) equals "BCLR" for business collections low risk, and the number of days (NDAYS) at which a tax liability is overdue is greater than or equal to 60 days, then action 64b (C-L) is taken so that a correspondence with a low intrusive tone is sent to the taxpayer.

FIG. 5(B) is a diagram illustrating a more detailed example of the operation of case management component 14. Referring now to FIG. 5(B), case management component 14 receives information 60 from decision management component 12. Based on information 60, case management component 14 determines an appropriate treatment scenario 68 to be performed for the respective taxpayers. As indicated in FIG. 5(B), different treatment scenarios 68 might include, for example, individual high risk collection, individual medium risk collection, individual low risk collection, business high risk collection, business medium risk collection, business low risk collection, field collection, individual non-filer collection, business non-filer collection, individual never-filed collection, business never-filed collection, field audit, desk audit, self audit, issue based audit, issue based education, risk of underreporting education, risk of not filing education, risk of not paying education and refund review. These are only examples of possible treatment scenarios, and the present invention is not limited to any specific examples.

Based on treatment scenario 68 into which a respective taxpayer is placed, specific actions will be implemented. For example, as illustrated in FIG. 5(B), if the taxpayer is in the business low risk collection (BCLR) treatment scenario, then a specific low risk action item 70 will be taken, based on the number of days the taxpayer liability is outstanding. Similarly, if the taxpayer is in the business medium risk collection (BCMR) treatment scenario, then a specific medium risk action item 72 will be taken, based on the number of days the taxpayer liability is outstanding. Further, if the taxpayer is in the business high risk collection (BCHR) treatment scenario, then a specific high risk action item 74 will be taken, based on the number of days the taxpayer liability is outstanding. As can be seen from FIG. 5(B), in this example, the time frame at which aggressive, intrusive action items are taken is much quicker with the high risk action times 74 as compared to the low risk action items 70.

Preferably, better treatment scenarios 68 are continually created as more is known about the taxpayers.

Figure 6:
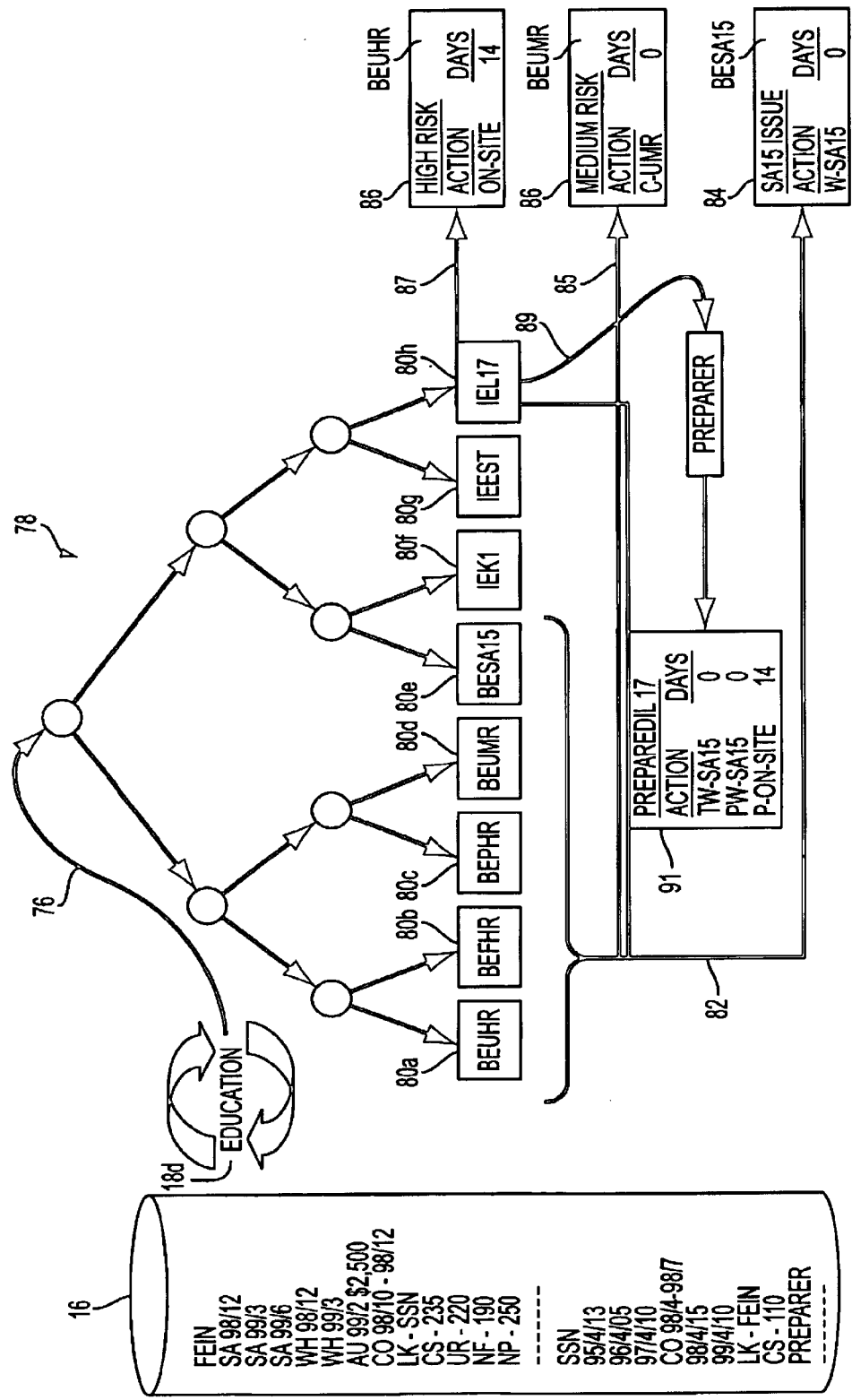
FIG. 6 is a diagram illustrating an example of a taxpayer compliance system as it relates to taxpayer education, according to an embodiment of the present invention.

FIG. 6 is a diagram illustrating an example of the taxpayer compliance system as it relates to taxpayer education, according to an embodiment of the present invention. Referring now to FIG. 6, education utility 18d identifies taxpayer profiles 16 which indicate a need for further education of the taxpayer by the tax agency. These identified taxpayers are then provided to decision management component 12 (see FIG. 1), as indicated by arrow 76 in FIG. 6. Then, via an assignment mechanism, such as decision tree 78, decision management component 12 assigns the identified taxpayer profiles into groups 80a through 80h. For example, group 80a uses the decision code "BEUHR" to indicate business education underreporting high risk, group 80b uses the decision code "BEFHR" to indicate business education filing high risk, group 80c uses the decision code "BEPHR" to indicate business education preparer high risk, group 80d uses the decision code "BEUMR" to indicate business education underreporting medium risk, group 80e uses the decision code "BESA15" to indicate business education sales tax line item 15, group 80f uses the decision code "IEK1" to indicate individual education KI, group 80g uses the decision code "IEEST" to indicate individual education for estimated tax, group 80h uses the decision code "IEL17" to indicate individual education for line item 17.

After the taxpayer profiles are assigned to groups, case management component 14 causes various actions to be implemented for the groups. For example, as indicated by arrow 82 in FIG. 6, action item 84 is taken for group 80e. Here, action item 84 indicates that a sales tax line item 15 worksheet (W-SA15) will be sent to each taxpayer in the group within zero days (that is, as soon as the case is transferred to case management component 14).

As indicated by arrow 85, action item 86 is taken for group 80d. Action item 86 indicates a correspondence (C) will be sent out for underreporting medium risk (UMR) within zero days. As indicated by arrow 87, action item 88 is taken for group 80a. Action item 88 indicates that on-site education (ON-SITE) will be provided to the taxpayer within fourteen days.

Arrow 89 indicates that, if a professional tax preparer was involved with preparing a return for the taxpayer, then action item 91 will be performed. Action item 91 indicates that a sales tax line item 15 worksheet (W-SA15) will be sent to the taxpayer (T) and the preparer (P) within zero days, and that on-site training (ON-SITE) will be provided to the preparer (P) within fourteen days.

FIG. 6 represents only one example of the taxpayer compliance system as it relates to taxpayer education. The present invention is not limited to this example. For example, the present invention is not limited to the specific groups, decision codes or actions of this example.

Figure 7:
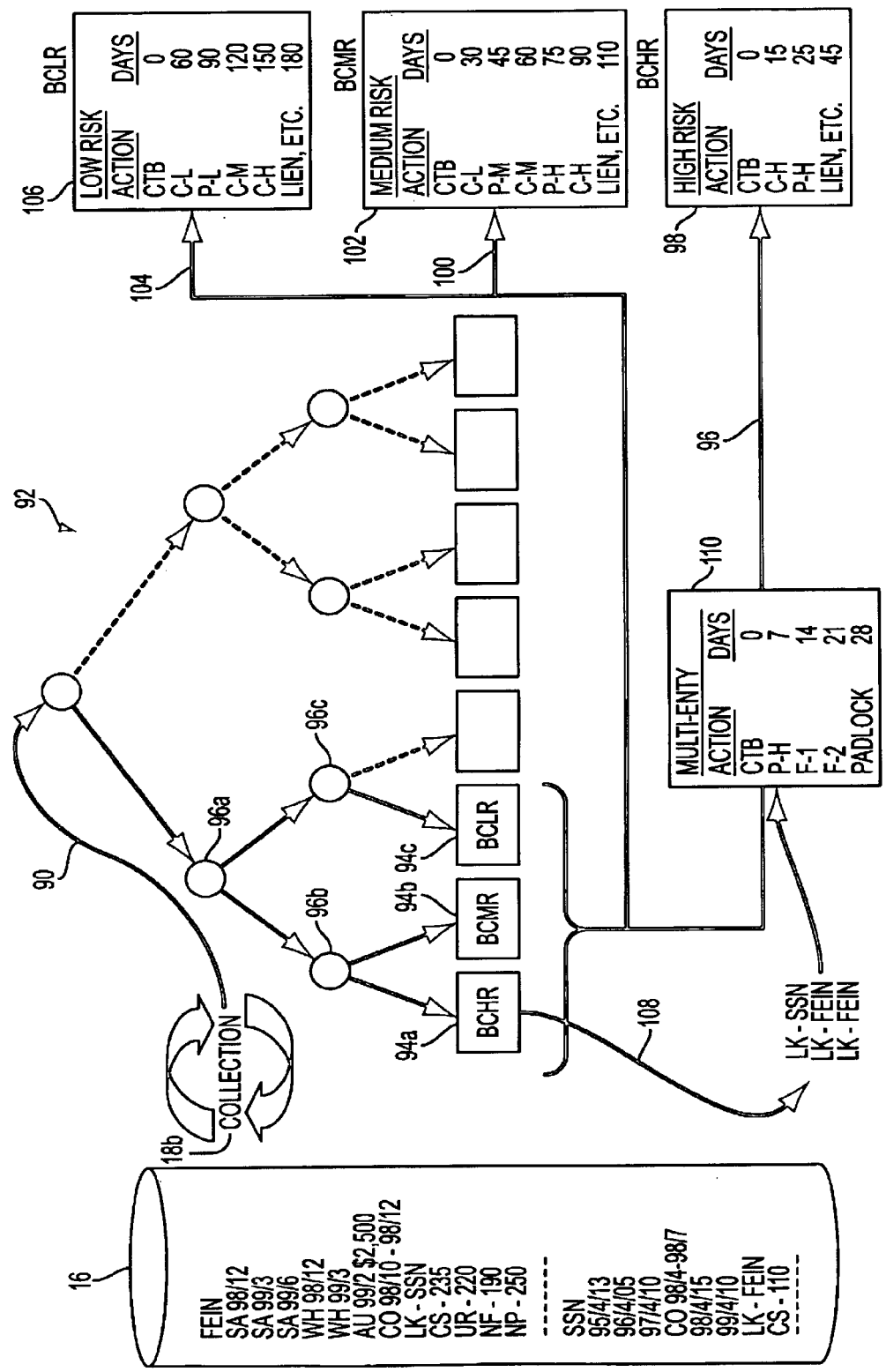
FIG. 7 is a diagram illustrating an example of a taxpayer compliance system as it relates to tax collections, according to an embodiment of the present invention.

FIG. 7 is a diagram illustrating an example of the taxpayer compliance system as it relates to tax collections, according to an embodiment of the present invention. Referring now to FIG. 7, collection utility 18b identifies taxpayer profiles for collection purposes. These identified taxpayers are then provided to decision management component 12 (see FIG. 1), as indicated by arrow 90 in FIG. 7. Then, via an assignment mechanism, such as decision tree 92, decision management component 12 assigns the identified taxpayer profiles into groups 94a through 94c. For example, group 94a uses the decision code "BCHR" to indicate business collection high risk, group 94b uses the decision code "BCMR" to indicate business collection medium risk, and group 94c uses the decision code "BCLR" to indicate business collection low risk. As an example, nodes 96a, 96b and 96 might use the criteria of type of taxpayer (i.e., business or individual), risk score and balance, respectively, to assign taxpayers to groups 94a, 94b and 94c.

After the taxpayer profiles are assigned to groups, case management component 14 causes various actions to be implemented for the groups. For example, as indicated by arrow 96 in FIG. 7, action item 98 is taken for the high risk group 94a. As indicated by arrow 100, action item 102 is taken for the medium risk group 94b. As indicated by arrow 104, action item 106 is taken for the low risk group 94c.

As indicated by arrow 108, in this example, if there are linkages (LK) for a respective business taxpayer by a social security number (SSN) or to other businesses by a tax id number (FEIN), then action item 110 would be taken.

FIG. 7 represents only one example of the taxpayer compliance system as it relates to collections. The present invention is not limited to this example. For example, the present invention is not limited to the specific groups, decision codes or actions of this example.

Figure 8:
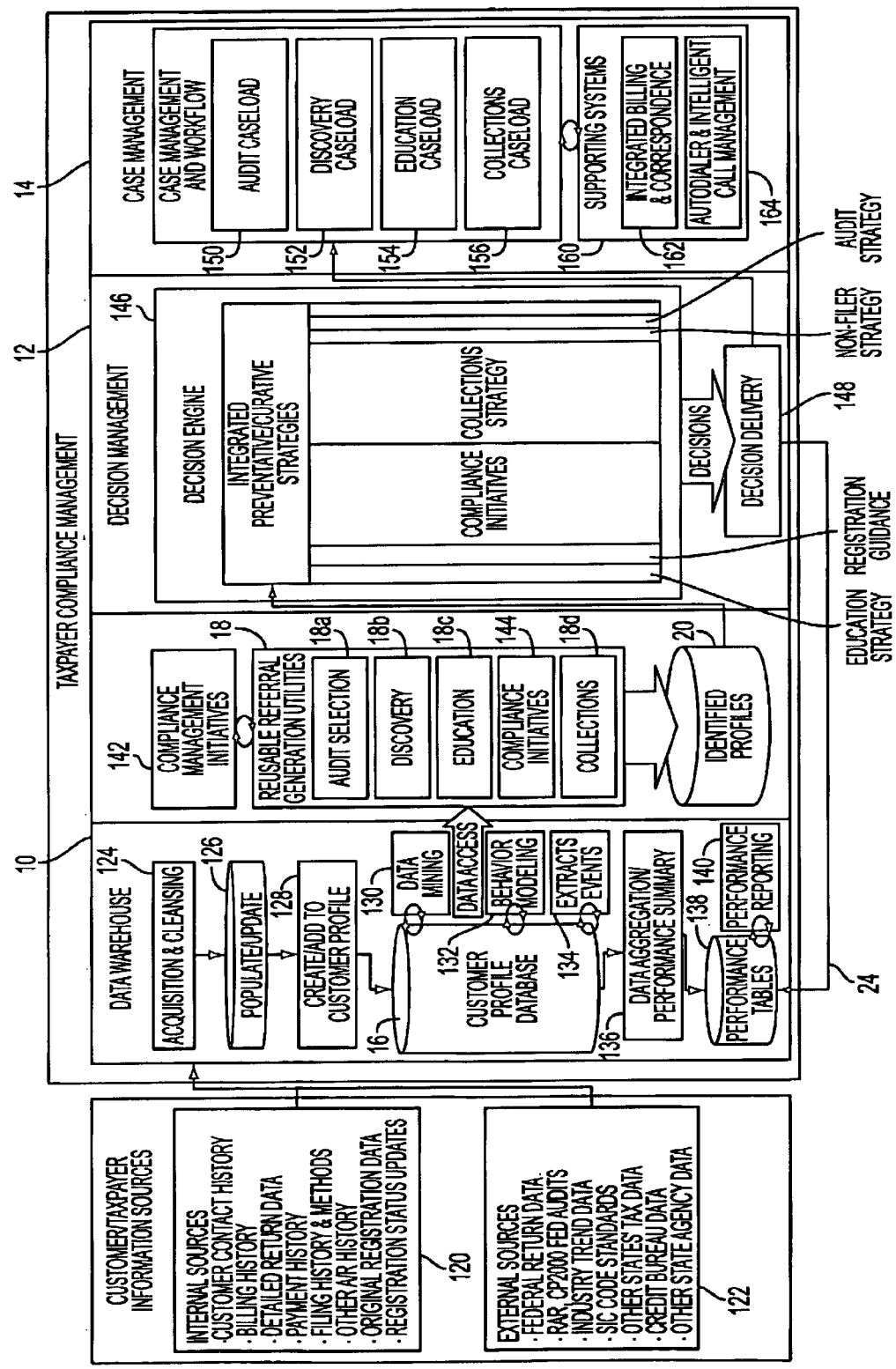
FIG. 8 is a more detailed diagram of the taxpayer compliance system in FIG. 1, according to an embodiment of the present invention.

FIG. 8 is a more detailed diagram of the taxpayer compliance system in FIG. 1, according to an embodiment of the present invention. As illustrated in FIG. 8, internal sources 120 and external sources 122 provide information. Data warehouse component 10 includes an acquisition and cleansing component 124, a populate/update component 126, a create/add to customer profile component 128, a data mining component 130, a behavior modeling component 132, an extracts events component 134, a data aggregation/performance summary component 136, a performance tables component 138 and a performance reporting component 140, which would all be easily understandable components in the art of data warehouse and data mining.

Data warehouse component 10 might also include compliance management initiatives 142 and a compliance initiative utility 144 to target specific, relatively small groups to try and improve tax compliance by these groups. The concept of a compliance initiative is well-known.

As indicated above, data warehouse component 10 might be based, for example, on ORACLE or SYBASE data warehouse software.

Decision management component 12 would typically include a decision engine 146 for creating and implementing strategies, and a decision delivery component 148 to provide decision information to data warehouse component 10. As indicated above, decision management component could be based, for example, on AMS STRATA release 2.0.

Case management component 14 would typically include an audit caseload component 150 for managing an audit caseload, a discovery caseload component 152 for managing a discovery caseload, an education caseload component 154 for managing an education caseload and a collections caseload component 156 for managing a collections caseload.

Various supporting systems 160 would typically be provided, such as an integrated billing and correspondence system 162 and an autodialer and intelligent call management system 164.

As indicated above, case management component 10 could be based, for example, on the AMS CACS PLUS FOR GOVERNMENT, version 2.0.

As indicated above, decision management component 12 could use, for example, the AMS STRATA release 2.0, which is a computer-implemented decision management system. Decision management systems are known. Generally, a decision management system is a computer-implemented system which applies strategies to determine actions to be taken, monitors performance based on the taken actions, and refines the strategies in accordance with the monitored performance. Therefore, in the present invention, a decision management system can be used as decision management component 12 to apply strategies to assign taxpayer profiles into groups, monitor performance of the groups, and refine the strategies in accordance with the monitored performance, to improve the effectiveness of the assignment process.

According to the above embodiments, an apparatus for promoting taxpayer compliance includes a computer-implemented data mining system, a computer-implemented decision management system and a computer-implemented case management system. The data mining system mines taxpayer data to identify taxpayer profiles for taxpayer compliance issues. The decision management system assigns the identified taxpayer profiles into groups based on characteristics of the taxpayer profiles. The case management system implements different treatments to different groups, to improve taxpayer compliance. Here, the term "computer-implemented" indicates that the system comprises hardware and software for performing the required operations, instead of being performed manually by humans. As indicated above, ORACLE or SYBASE provide computer-implemented data mining systems, AMS STRATA release 2.0 is a type of computer-implemented decision management system, and AMS CACS PLUS FOR GOVERNMENT, version 2.0, is a type of computer-implemented case management system.

The present invention is applicable to virtually any tax agency in the United States, whether at the local, state or federal level. However, the present invention is not limited to use with tax agencies in the United States Instead, the present invention would be applicable to tax entities worldwide. Moreover, although many of the above examples describe the present invention as for use by a tax "agency," the present invention is applicable to virtually any type of tax organization, whether it is referred to as an "agency," "department," "bureau," or by some other term. Further, the present invention is not necessarily limited for use by government entities, and can be used by private taxing entities.

According to the above embodiments of the present invention, taxpayer data is mined to identify taxpayer profiles for "taxpayer compliance issues." Here, "taxpayer compliance issues" refer to matters relating, for example, to auditing taxpayers, collecting tax liabilities, discovering information from taxpayers, educating taxpayers, or performing outreach activities. However, the present invention is not limited to these specific taxpayer compliance issues, and other taxpayer compliance issues can, of course, be promoted and addressed by the present invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus comprising:
   a computer-implemented data mining system which mines taxpayer data by a computer to create taxpayer profiles of taxpayers, and identifies taxpayer profiles of the created taxpayer profiles for taxpayer compliance issues, each taxpayer profile being a profile of a respective taxpayer and including information relating to a plurality of taxpayer events for the respective taxpayer;
   a computer-implemented decision management system which assigns the identified taxpayer profiles into groups by a computer based on characteristics of the taxpayer profiles;
   a computer-implemented case management system which, by a computer, determines different treatments to be implemented for different of the groups to improve taxpayer compliance and, by a computer, implements the treatments for the groups in accordance with the determination; and
   a feedback mechanism feeding back a result of the decision management system into the taxpayer data by a feedback loop for mining by the data mining system, and feeding back a result of the case management system into the taxpayer data by a feedback loop for mining by the data mining system, to increase effectiveness of the apparatus in improving taxpayer compliance.

2. An apparatus as in claim 1, wherein the data mining system mines taxpayer data via an audit selection utility which identifies taxpayer profiles for tax auditing.

3. An apparatus as in claim 1, wherein the data mining system mines taxpayer data via a collection utility which identifies taxpayer profiles for collection purposes.

4. An apparatus as in claim 1, wherein the data mining system mines taxpayer data via a discovery utility which identifies taxpayer profiles for discovery purposes.

5. An apparatus as in claim 1, wherein the data mining system mines taxpayer data via an education utility which identifies taxpayer profiles indicating a need for further education of the taxpayer by the agency.

6. An apparatus as in claim 1, wherein the data mining system mines taxpayer data via at least two of the group consisting of
 an audit selection utility which identifies taxpayer profiles for tax auditing,
 a collection utility which identifies taxpayer profiles for collection purposes,
 a discovery utility which identifies taxpayer profiles for discovery purposes, and
 an education utility which identifies taxpayer profiles indicating a need for further education of the taxpayer by the agency.

7. An apparatus as in claim 1, wherein the decision management system applies strategies to assign the taxpayer profiles into groups, monitors performance of the groups, and refines the strategies in accordance with the monitored performance.

8. An apparatus comprising:
 mining means for mining taxpayer data by a computer to create taxpayer profiles of taxpayers and for identifying taxpayer profiles of the created taxpayer profiles for taxpayer compliance issues, each taxpayer profile being a profile of a respective taxpayer and including information relating to a plurality of taxpayer events for the respective taxpayer;
 assigning means for assigning the identified taxpayer profiles by a computer into groups based on characteristics of the taxpayer profiles;
 means for feeding back results of the assigning means to the taxpayer data by a computer for the mining by the mining means;
 determination means for, by a computer, determining different treatments to be implemented for different of the groups to improve taxpayer compliance;
 implementing means for implementing, by a computer, the treatments for the groups in accordance with the determination by the determination means; and
 means for feeding back results of the implementing means to the taxpayer data by a computer for the mining by the mining means, wherein the fed back results of the assigning means and the implementing means are feedback for increasing the effectiveness of the apparatus in improving taxpayer compliance.

9. An apparatus as in claim 1, wherein the computer-implemented data mining system identifies relevant links between the taxpayer profiles.

10. An apparatus as in claim 6, wherein the computer-implemented data mining system identifies relevant links between taxpayer profiles.

11. A method comprising:
 mining taxpayer data by a computer to create taxpayer profiles and relevant links between the taxpayer profiles for taxpayer compliance issues, each taxpayer profile being a profile of a respective taxpayer and including information relating to a plurality of taxpayer events for the respective taxpayer, said mining mines taxpayer data via at least two of the group consisting of
  an audit selection utility which identifies taxpayer profiles from the created taxpayer profiles and relevant links for tax auditing,
  a collection utility which identifies taxpayer profiles from the created taxpayer profiles and relevant links for collection purposes,
  a discovery utility which identifies taxpayer profiles from the created taxpayer profiles and relevant links for discovery purposes, and
  an education utility which identifies taxpayer profiles from the created taxpayer profiles and relevant links for further education of the taxpayer;
 assigning the identified taxpayer profiles by a computer into groups based on characteristics of the taxpayer profiles;
 feeding back a result of said assigning into the taxpayer data by a computer for the mining by said mining;
 determining different treatments to be implemented for different of the groups by a computer to improve taxpayer compliance;
 implementing the treatments for the groups by a computer in accordance with the determination by said determining; and
 feeding back a result of said implementing into the taxpayer data by a computer for the mining by said mining, wherein the fed back result of said assigning and the fed back result of said implementing are feedback for increasing the effectiveness of the method in improving taxpayer compliance.

12. An apparatus comprising:
 a computer-implemented data mining system mining taxpayer data by a computer to create taxpayer profiles and relevant links between the taxpayer profiles for taxpayer compliance issues, each taxpayer profile being a profile of a respective taxpayer and including information relating to a plurality of taxpayer events for the respective taxpayer, said mining mines taxpayer data via at least two of the group consisting of
  an audit selection utility which identifies taxpayer profiles from the created taxpayer profiles and relevant links for tax auditing,
  a collection utility which identifies taxpayer profiles from the created taxpayer profiles and relevant links for collection purposes,
  a discovery utility which identifies taxpayer profiles from the created taxpayer profiles and relevant links for discovery purposes, and
  an education utility which identifies taxpayer profiles from the created taxpayer profiles and relevant links for further education of the taxpayer;
 a computer-implemented decision management system assigning the identified taxpayer profiles by a computer into groups based on characteristics of the taxpayer profiles;
 a computer-implemented feedback loop feeding back a result of said assigning into the taxpayer data for the mining by the data mining system;
 a computer-implemented case management system determining, by a computer, different treatments to be implemented for different of the groups to improve taxpayer compliance and, by a computer, implementing the treatments to the groups in accordance with the determination; and
 a computer-implemented feed back loop feeding back a result of said implementing into the taxpayer data for the mining by the data mining system, wherein the fed back result of said assigning and the fed back result of said implementing are feedback for increasing the effectiveness of the apparatus in improving taxpayer compliance.

13. A method comprising:

mining taxpayer data by a computer to create taxpayer profiles and relevant links between the taxpayer profiles, each taxpayer profile being a profile of a respective taxpayer and including information relating to a plurality of taxpayer events for the respective taxpayer;

identifying taxpayer profiles for tax compliance issues by a computer from the created taxpayer profiles and relevant links;

assigning the identified taxpayer profiles by a computer into groups based on characteristics of the identified taxpayer profiles;

feeding back a result of said assigning into the taxpayer data by a computer for the mining by said mining;

determining different treatments to be implemented for different of the groups by a computer, to improve taxpayer compliance;

implementing the treatments to the groups by a computer in accordance with the determination by said determining; and feeding back a result of said implementing into the taxpayer data by a computer for the mining by said mining, wherein the fed back result of said assigning and the fed back result of said implementing are feedback for increasing the effectiveness of the method in improving taxpayer compliance.

14. An apparatus comprising:

a computer-implemented data mining system mining taxpayer data by a computer to create taxpayer profiles and relevant links between the taxpayer profiles, and identifying taxpayer profiles for tax compliance issues from the created taxpayer profiles and relevant links, each taxpayer profile being a profile of a respective taxpayer and including information relating to a plurality of taxpayer events for the respective taxpayer;

a computer-implemented decision management system assigning the identified taxpayer profiles into groups by a computer based on characteristics of the identified taxpayer profiles;

a computer-implemented feedback loop feeding back a result of said assigning into the taxpayer data for the mining by the data mining system;

a computer-implemented case management system determining, by a computer, different treatments to be implemented to different of the groups to improve taxpayer compliance and, by a computer, implementing the treatments to the groups in accordance with the determination; and a computer-implemented feedback loop feeding back a result of said implementing into the taxpayer data for the mining by the data mining system, wherein the fed back result of said assigning and the fed back result of said implementing being feedback for increasing the effectiveness of the apparatus in improving taxpayer compliance.

\* \* \* \* \*

UNITED STATES PATENT AND TRADEMARK OFFICE
CERTIFICATE OF CORRECTION

PATENT NO. : 6,912,508 B1 Page 1 of 1
DATED : June 28, 2005
INVENTOR(S) : John D. McCalden et al.

It is certified that error appears in the above-identified patent and that said Letters Patent is hereby corrected as shown below:

<u>Column 12,</u>
Line 8, after "United States" insert -- . --.

Signed and Sealed this

Twenty-fifth Day of April, 2006

JON W. DUDAS
*Director of the United States Patent and Trademark Office*